United States Patent
Benzler et al.

(10) Patent No.: US 6,714,593 B1
(45) Date of Patent: Mar. 30, 2004

(54) MOTION COMPENSATING PREDICTION OF MOVING IMAGE SEQUENCES

(75) Inventors: Ulrich Benzler, Langenhagen (DE); Mladen Berekovic, Hemmingen (DE); Michael Wollborn, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,825

(22) PCT Filed: Oct. 21, 1998

(86) PCT No.: PCT/DE98/02267

§ 371 (c)(1), (2), (4) Date: Jun. 5, 2000

(87) PCT Pub. No.: WO99/21365

PCT Pub. Date: Apr. 29, 1999

(30) Foreign Application Priority Data

Oct. 21, 1997 (DE) .......................................... 197 46 214

(51) Int. Cl.$^7$ .............................. H04N 7/12; G06K 9/36
(52) U.S. Cl. ............................ 375/240.16; 375/240.12; 382/236; 382/238
(58) Field of Search ...................... 375/240.16, 240.18, 375/240.25, 240.12, 240.17, 240.29, 240.02; 382/236, 242, 243, 238; 348/620, 448, 416.1, 420.1, 402.1

(56) References Cited

U.S. PATENT DOCUMENTS

| | | | |
|---|---|---|---|
| 4,864,393 A | | 9/1989 | Harradine |
| 5,019,903 A | * | 5/1991 | Dougall et al. ............. 348/448 |
| 5,134,480 A | * | 7/1992 | Wang et al. ................ 348/620 |
| 5,329,318 A | | 7/1994 | Keith |
| 5,396,592 A | | 3/1995 | Fujimoto |
| 5,892,518 A | * | 4/1999 | Mizobata et al. ........... 345/474 |
| 6,046,773 A | * | 4/2000 | Martens et al. ........ 375/240.25 |
| 6,381,279 B1 | * | 4/2002 | Taubman ............... 375/240.18 |

FOREIGN PATENT DOCUMENTS

| | | |
|---|---|---|
| DE | 197 30 305 A1 | 1/1999 |
| EP | 0 368 151 B1 | 8/1995 |
| EP | 0 558 922 B1 | 12/1996 |

OTHER PUBLICATIONS

Manfred Ziegler, Hierarchical motin estimation using the phase correlation method in 140Mbits/s HDTV_Coding 1990. Elsevier.*
"MPEG–4 Video Verification Model Version 8.0", Stockholm, Jul. 1997, MPEG 97/N1796 in ISO/IEC JTC1/SC 29/WG 11.
Working Draft Version 4.0, MPEG 97/N1797.
Pang K et al: "Optimum Loop Filter in Hybrid Coders", IEEE Transactions of Circuits and Systems for Videu Technology, BD. 4, NR. 2, Apr. 1, 1994, pp. 158–167.
Herley C et al: "Orthogonal Time–Varying Filter Banks . . . ", IEEE Transactions on Signal Processing, BD. 42, NR. 10, Oct. 1, 1994, pp. 2650–2663.
Quieiroz De R L.: "Subband Processing of Finite Length Signals . . . ", Digital Signal Processing 1, San Francisco, Mar. 23–26, 1992, BD. 4, NR. Conf. 17, Mar. 23, 1992, pp. IV–613–IV–616.
Barnard H et al: "Efficient Signal Extension for Subband/Wavelet Decomposition . . . ", Proceedings of the SPIE, BD. 2094, NR. Part 02, Nov. 8, 1993.

* cited by examiner

Primary Examiner—Gims Philippe
(74) Attorney, Agent, or Firm—Michael J. Striker

(57) ABSTRACT

For the determination of motion vectors, an aliasing-reducing interpolation filtration with a sub-pel precision is used in the motion-compensated prediction of moving image sequences. More adjacent pixels are accessed in this interpolation filtration than in known bilinear interpolation. Asymmetrical filtration or reflection of pixels inside a reference image block is used to assure that maximally, a block of the reference image containing (M+1)×(M+1) pixels for interpolation filtration is accessed. However this process requires less memory bandwidth in accessing reference images.

7 Claims, 3 Drawing Sheets

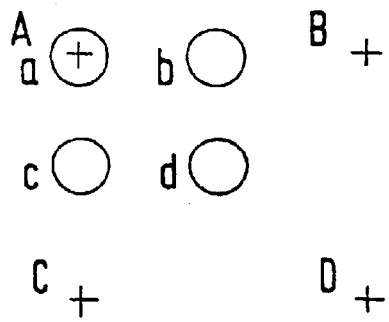

| $D_{-4}$ | $D_{-3}$ | $D_{-2}$ | $D_{-1}$ | $D_{+1}$ | $D_{+2}$ | $D_{+3}$ | $D_{+4}$ |
| + | + | + | + | + | + | + | + |
| $C_{-4}$ | $C_{-3}$ | $C_{-2}$ | $C_{-1}$ | $C_{+1}$ | $C_{+2}$ | $C_{+3}$ | $C_{+4}$ |
| + | + | + | + | + | + | + | + |
| $B_{-4}$ | $B_{-3}$ | $B_{-2}$ | $B_{-1}$ | $B_{+1}$ | $B_{+2}$ | $B_{+3}$ | $B_{+4}$ |
| + | + | + | + | + | + | + | + |
| $A_{-4}$ $c_{-4}^{+}{}_0$ | $A_{-3}$ $c_{-3}^{+}{}_0$ | $A_{-2}$ $c_{-2}^{+}{}_0$ | $A_{-1}$ $c_{-1}^{+}{}_0$ $b_0$ $d_0$ | $A_{+1}$ $c_{+1}^{+}{}_0$ | $A_{+2}$ $c_{+2}^{+}{}_0$ | $A_{+3}$ $c_{+3}^{+}{}_0$ | $A_{+4}$ $c_{+4}^{+}{}_0$ |
| $E_{-4}$ | $E_{-3}$ | $E_{-2}$ | $E_{-1}$ | $E_{+1}$ | $E_{+2}$ | $E_{+3}$ | $E_{+4}$ |
| + | + | + | + | + | + | + | + |
| $F_{-4}$ | $F_{-3}$ | $F_{-2}$ | $F_{-1}$ | $F_{+1}$ | $F_{+2}$ | $F_{+3}$ | $F_{+4}$ |
| + | + | + | + | + | + | + | + |
| $G_{-4}$ | $G_{-3}$ | $G_{-2}$ | $G_{-1}$ | $G_{+1}$ | $G_{+2}$ | $G_{+3}$ | $G_{+4}$ |
| + | + | + | + | + | + | + | + |
| $H_{-4}$ | $H_{-3}$ | $H_{-2}$ | $H_{-1}$ | $H_{+1}$ | $H_{+2}$ | $H_{+3}$ | $H_{+4}$ |
| + | + | + | + | + | + | + | + |

MOTION COMPENSATING PREDICTION OF MOVING IMAGE SEQUENCES

PRIOR ART

The invention is based on a process for the motion-compensated prediction of moving image sequences using motion vectors which, for each image block of a current image, indicate the position of the image block used for the prediction in relation to an already transmitted reference image.

EP 0 558 922 B2 has disclosed a process for improving motion estimation in image sequences in half pel precision in accordance with the full search process. In this document, in a first process step, the search range is filtered and in a second process step, the match block is filtered with the aid of an additional digital filter which permits a raster shifting of the pixel raster by ¼ pel. This measure prevents a distortion of the motion vector field.

"MPEG-4 Video Verification Model Version 8.0", Stockholm, July 1997, MPEG 97/N1796 in ISO/IEC JTC1/SC 29/WG11 specifies an encoder and decoder for object-based encoding of moving image sequences. In an accompanying Working Draft Version 4.0, a decoder is specified under MPEG 97/N1797. In a video session (VS), rectangular images of a fixed size are no longer are encoded and transmitted to the receiver, instead so-called VIDEO OBJECTS (VO) are encoded and transmitted, which are permitted to have an arbitrary shape and size. These video objects can then be divided further into different video object layers (VOL) in order, for example, to represent different resolution stages of a video object. The image data of a particular layer in the camera image plane at a particular time is referred to as a VIDEO OBJECT PLANE (VOP). Consequently, the relation between VO and VOP is equivalent to the relation between the image sequence and image in the case of the transmission of rectangular images of a fixed size.

The motion-compensated prediction in the verification model is carried out with the aid of so-called block motion vectors which, for each 8×8 or 16×16-sized block of pixels of the current image, indicate the position of the block used for the prediction in an already transmitted reference image. The amplitude resolution of the motion vectors is thereby limited to a half pixel, wherein pixels between those of the scanning raster (half pixel position) are generated from the pixels on the scanning raster (integer pixel position) by means of a bilinear interpolation filtration (FIG. 1). In this connection, the + symbol indicates the integer pixel position and O indicates the half pixel position. The interpolated values a, b, c, and d in the half pixel position are produced by the following relations:

$$a=A, \; b=(A+B)//2, \; c=(A+C)//2,$$

$$d=(A+B+C+D)//4, \text{ wherein } // \text{ indicates a rounded integer division.}$$

DE-197 30 305.6 has proposed a process for generating an improved image signal with an improved quality of the prediction signal and consequently of the encoding efficiency. In order to generate pixels between those of the pixel scanning raster, a larger local area is taken into consideration than in bilinear interpolation. The aliasing-reducing interpolation filtration results in an increased resolution of the motion vector and thereby to a prediction gain and an increased encoding efficiency. The FIR filter coefficients in this instance can be adapted to the signals to be encoded and can be separately transmitted for each video object, which permits an additional efficiency increase for the encoding and increases the flexibility of the process. In contrast to the embodiment according to EP 0 558 922 B1, no additional poly-phasic filter structures have to be designed for intermediary positions with ¼ pel pixel resolution in the horizontal and vertical direction.

It is also possible in this instance that with a constant data rate, the image sequence frequency of an MPEG-1 encoder can be doubled from 25 Hz to 50 Hz. In an MPEG-2 encoder, the data rate can be reduced by up to 30% while the image quality remains constant.

SUMMARY OF THE INVENTION

According to the invention the process for motion-compensated prediction of moving image sequences uses motion vectors, which, for each image block of a current image, indicate the position of the image block used for the prediction in comparison to an already transmitted reference image, wherein an aliasing-reducing interpolation filtration with a sub-pel precision is used for determination of motion vectors, wherein more adjacent pixels are accessed for interpolation than in a bilinear interpolation, and wherein the interpolation filtration is carried out as a function of the position of an intermediary pixel value to be interpolated so that maximally, a block of the reference image containing (M+1)×(M+1) pixels must be accessed for the prediction of an image block of M×M pixels for filtration, or in the prediction of an image block of M×M pixels, the pixels that are required for the interpolation filtration and are disposed outside an (M+1)×(M+1) image block of the reference block are generated by reflecting the pixels disposed inside the reference block to a block edge.

The decisive advantage that the interpolation filtration according to the invention, has in comparison to the previously disclosed processes is the clearly reduced complexity of the implementation of the process, particularly in terms of the memory bandwidth in accessing reference images, which bandwidth is required for motion compensated prediction. Whereas previously, the memory bandwidth required for this was up to 3 times higher than that required in bilinear interpolation at ½ pixel amplitude resolution of the motion vectors, in the process according to the invention, the memory bandwidth required here is identical to that of the bilinear interpolation. On the other hand, the advantages of the improved process are retained, namely a more efficient encoding of the moving image sequence according to DE 197 30 305.6.

The difference between the alternative of carrying out the interpolation filtration as a function of an intermediary pixel value to be interpolated so that maximally, a block of the reference image containing (M+1)×(M+1) pixels must be accessed and the alternative of generating required pixels by reflecting pixels disposed inside the reference block to a block edge lies essentially In that with the option of generating required pixels by reflecting the hardware realization of the process is simpler than in the former option. On the other hand, the former option permits the use of specially developed asymmetrical filters.

FIR filters with N stages are used for the interpolation filtration according to the invention.

The number of pixels of the reference image required for the prediction of an image block is reduced with the process according to the invention. This improves the complexity of the process according to DE 197 30 305.6, in particular it reduces the complexity of the originally used bilinear interpolation filtration at ½ pixel amplitude resolution of the motion vectors without significantly impairing the gains that can be achieved by means of the improved process.

The difference between the options of claims 1 and 2 lies essentially in that with the option according to claim 2, the hardware realization of the process is simpler than in the option according to claim 1. On the other hand, the option according to claim 1 permits the use of specially developed asymmetrical filters.

FIR filters with N stages are used for the interpolation filtration according to the invention.

The number of pixels of the reference image required for the prediction of an image block is reduced with the process according to the invention. This improves the complexity of the process according to DE 197 30 305.6, in particular it reduces the complexity of the originally used bilinear interpolation filtration at ½ pixel amplitude resolution of the motion vectors without significantly impairing the gains that can be achieved by means of the improved process.

BRIEF DESCRIPTION OF THE DRAWINGS

Exemplary embodiments of the invention will now be explained in detail in conjunction with the accompanying figures, in which:

FIG. 1 shows an interpolation diagram for pixels in a known bilinear interpolation filtration, FIG. 2 shows an interpolation diagram for pixels between those of the pixel scanning raster in a method of interpolation filtration according to the invention which accesses more adjacent pixels than a known bilinear interpolation filtration method.

DESCRIPTION OF EXEMPLARY EMBODIMENTS

The starting point of the specification is the process according to DE 197 30 305.6 which, as described below, will be improved with regard to the ¼ pel resolution.

With this process, motion vectors are established for image blocks and, for each image block of a current image, these motion vectors indicate the position of the image block used for the prediction in relation to an already transmitted reference image.

The determination of motion vectors for the prediction can take place in three successive steps, as disclosed, for example, in DE 197 30 305.6.

In a first search step, a motion vector with a pel precision is determined for each image block in accordance with a conventional process, e.g. the full search block-matching method. In this connection, the minimum of the error criterion for possible movement positions is determined and the vector is selected that best describes the motion of the image block (EP 0 368 151 B1).

In a second search step, which is in turn based on this kind of minimum search for the error criterion, starting from the motion vector with pel precision determined in the first step, an improved motion vector with sub-pel precision is determined through an aliasing-reducing interpolation filtration by means of a digital, symmetrical FIR (finite impulse response) filter. In this case, the resolution is selected to be higher than in the first search step; preferably a resolution of a half pixel with reference to the pixel raster is selected. FIG. 2 shows the interpolation pattern for the pixels b, c, and d between the pixels of the pixel raster, which are produced from the adjacent pixels A, B, C, D, E, F, G, H on the pixel raster. The + symbol indicates the integer pixel position, o indicates the half pixel position. The following equations apply:

$$b = (CO1 \times (A_{-1} + A_{+1}) + CO2 \times (A_{-2} + A_{+2}) + CO3 \times (A_{-3} + A_{+3}) + CO4 \times (A_{-4} + A_{+4}))/256$$

$$c_i = (CO1 \times (A_i + E_i) + CO2 \times (B_i + F_i) + CO3 \times (C_i + G_i) + CO4 \times (D_i + H_i))/256$$

$$d = (CO1 \times (c_{-1} + c_{+1}) + CO2 \times (c_{-2} + c_{+2}) + CO3 \times (c_{-3} + c_{+3}) + CO4 \times (c_{-4} + c_{+4}))/256$$

Figure 3:
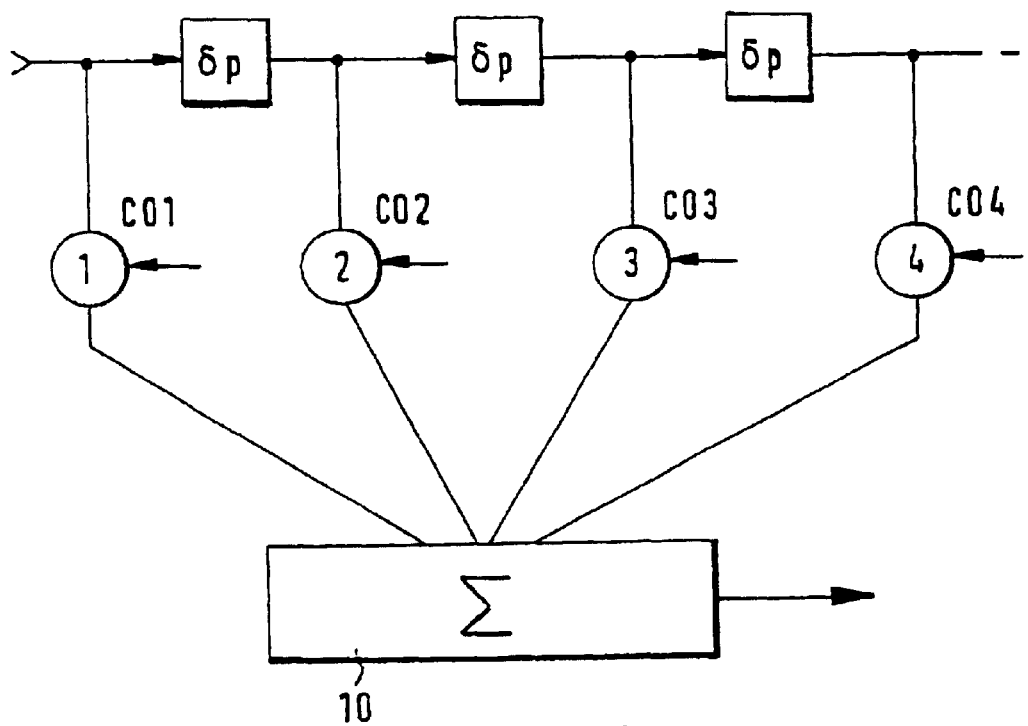
FIG. 3 shows the structure of an FIR filter for the interpolation.

The structure of the FIR interpolation filter used is shown in FIG. 3. After each pixel position $\delta p$, this filter has a branch to a coefficient evaluator 1, 2, 3, etc. and a summation device 10 at the output. As can be seen from the relations above, in order to generate pixels between the pixels of the scanning raster, a larger local area is taken into account than in the bilinear interpolation according to the prior art. The interpolation filtration coefficients CO1, CO2, CO3, CO4 are determined so that the interpolation error capacity is minimal. The coefficients can be determined directly with the known estimation process that has the lowest average quadratic error. The minimization of the interpolation error capacity yields a linear equation system whose coefficients can be derived based on the orthoganality principle. A set of FIR filter coefficients that are optimized in this way is expressed by the coefficients CO1=161/256, CO2=−43/256, CO3=23/256, CO4=−8/256.

In the third search step, starting from the motion vector determined in ½ pel precision, by means of another interpolation filtration, a local search based on the eight neighboring pixels is carried out with a resolution that is increased even further, for example to ¼ pixel. As before, the motion vector is selected which has the lowest prediction error capacity.

Figure 4:
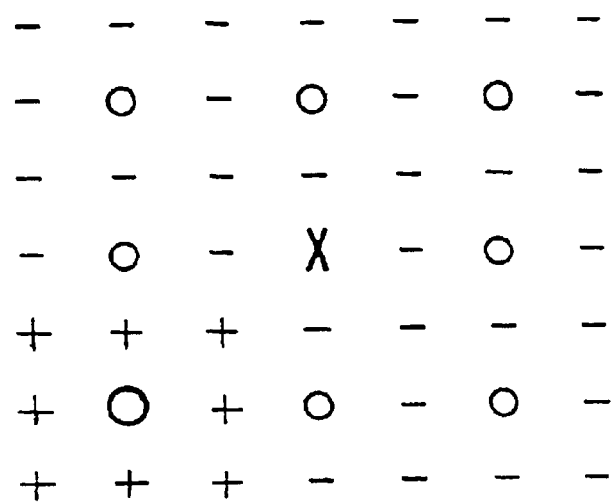
FIG. 4 shows another interpolation with a higher resolution.

The interpolation pattern for this is shown in FIG. 4. The integer pixel positions are indicated with X, the half-pixel pel positions are indicated with o, and the quarter-pixel pel positions are indicated with a − sign. O marks the best compensation with ½ pixel and a + sign marks the quarter pixel search position.

Interpolation is carried out with reference to the pixel raster at half pixel resolution from the second search step, with the FIR filter coefficients CO1'=½, CO2'=0, CO3'=0, CO4'=0.

The interpolation technique mentioned above is used for the motion-compensated prediction.

If the processing is carried out with a reduced image format in an encoder (SIF format in an MPEG-1 encoder or Q-CIF in an H.263 encoder), but the original input format is used for display, e.g. CCIR 601[1] in MPEG-1 or CIF in H.263, then a local interpolation filtration must be carried out as a subsequent processing. The above-described aliasing-compensating interpolation filtration can also be carried out for this purpose.

In order to activate the aliasing-compensating interpolation with ¼ pel resolution, activation bits can be introduced into an image transmission bit stream.

For the prediction of video objects, the filter coefficients CO1 to CO4 and CO1' to CO4' can be prepared separately for each of the video objects VO and can be introduced into the image transmission bit stream at the beginning of the transmission of the respective video object.

In order to encode a motion vector, the value range of the motion vector differences to be encoded can be adapted to the increased resolution.

The use of an aliasing-reducing FIR (finite impulse response) filter structure with N stages and the increased amplitude resolution of the motion vectors are retained in the interpolation filtration that is changed according to the invention. However, the number of pixels of the reference image required for the prediction of an image block is reduced.

In a first embodiment, a positionally adaptive, asymmetric FIR filter structure is used.

The symmetry of the filter structure is selected as a function of the position of the intermediary pixel value to be interpolated so that maximally, a block of the reference image that is (M+1)×(M+1) pixels in size must be accessed for the prediction of a block of M×M pixels for filtration. The principle of positional adaptivity is depicted for the one-dimensional case in FIG. 5.

Figure 5:
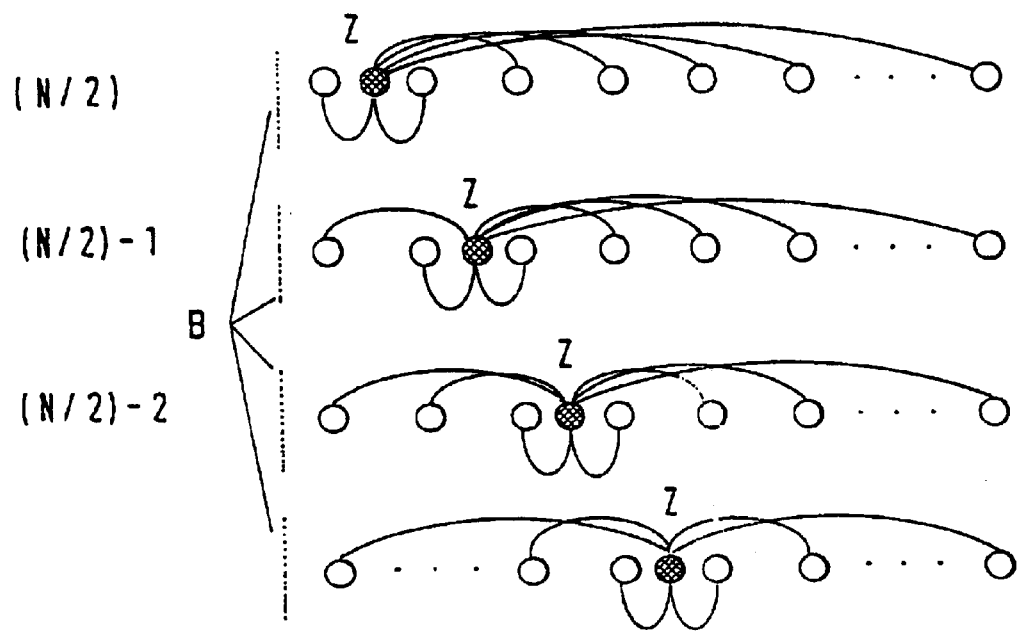
FIG. 5 shows an interpolation filtration using a positionally adaptive asymmetrical FIR filter with N stages.

As can be seen from FIG. 5, for symmetry reasons, with a filter length of N, a total of N/2 different positionally adaptive filters are required for the interpolation. The corresponding filter coefficients can either be determined once or can be transmitted to the receiver once before the beginning of the image transmission.

For the interpolation filtration of intermediary pixels Z in the vicinity of block edges B, all of the pixels, starting from a current intermediary pixel position to the block edge, are taken into account and the pixels disposed opposite the intermediary pixel position are only taken into account until in total, a predetermined number of pixels for the interpolation is reached.

In the example shown in FIG. 5, in order to carry out the interpolation for an intermediary pixel Z, with the filter (N/2)–1, two pixels to the left of the intermediary pixel are evaluated and for example six pixels to the right of it are evaluated. With the filter (N/2)–2, three pixels to the left of it are evaluated and five points to the right of it are evaluated, etc.

Figure 6:
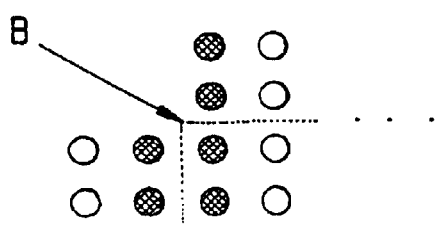
FIG. 6 shows an interpolation filtration using a reflection of pixels that lie within an image block.

In an alternative embodiment, the pixels, which are required for the interpolation filtration in the prediction of a block that is M×M pixels and are disposed outside a (M+1)× (M+1) block of the reference image, are generated by reflection of the pixels disposed inside the reference block to the block edge according to FIG. 6.

As shown in FIG. 6, at a corner of block edges B, pixels are reflected both upward and leftward. The same thing is done at other corners. In the exemplary embodiment according to FIG. 6, a symmetrical filter structure according to FIG. 2 can be used for interpolation filtration of a motion vector at ¼ pel precision.

What is claimed is:

1. A process for the motion-compensated prediction of moving image sequences that uses motion vectors which, for each image block of a current image, indicate the position of the image block used for the prediction in comparison to an already transmitted reference image, with the following steps:

for the determination of motion vectors, an aliasing-reducing interpolation filtration with a sub-pel precision is used, wherein more adjacent pixels are accessed for the interpolation than in a bilinear interpolation, the interpolation filtration is carried out as a function of the position of an intermediary pixel value to be interpolated so that maximally, a block of the reference image containing (M+1)×(M+1) pixels must be accessed for the prediction of an image block of M×M pixels for filtration.

2. A process for the motion-compensated prediction of moving image sequences that uses motion vectors which, for each image block of a current image, indicate the position of the image block used for the prediction in comparison to an already transmitted reference image, with the following steps:

for the determination of motion vectors, an aliasing-reducing interpolation filtration with a sub-pel precision is used, wherein more adjacent pixels are accessed for the interpolation than in a bilinear interpolation, in the prediction of an image block of M×M pixels, the pixels that are required for the interpolation filtration and are disposed outside an (M+1)×(M+1) image block of the reference block are generated by reflecting the pixels disposed inside the reference block to a block edge.

3. The process according to claim 1, characterized in that for the interpolation filtration, a positionally adaptive asymmetrical FIR filter structure is used which, for the interpolation filtration of intermediary pixels in the vicinity of block edges, respectively takes into consideration all of the pixels, starting from a current intermediary pixel position to the block edge, and only considers the pixels disposed opposite the intermediary pixel positions until in total, a predetermined number of pixels for the interpolation is reached.

4. The process according to claim 1, characterized in that for the interpolation filtration with a filtration length of N filter elements, a total of N/2 different positionally adaptive filters are used.

5. The process according to claim 1, characterized in that the filter coefficients for the interpolation filtration are either determined once or are transmitted to a receiver before the beginning of the image transmission.

6. The process according to claim 2, characterized in that after the reflection of the pixels disposed inside the reference block, a symmetrical filter structure is used for the interpolation filtration.

7. The process according to claim 1, characterized in that for the determination of a motion vector, a multi-step interpolation process is used, wherein in a first search step, a motion vector with pel precision is determined, in a second search step, an improved motion vector at half pel precision is determined by means of interpolation filtration, and in a third search step, the interpolation filtration according to the last step of claim 1 or claim 2 is carried out, in particular at quarter pel precision.

* * * * *